Sept. 16, 1958 E. W. JENKINS, JR 2,852,600

WELL SURVEYING BY TELEVISION

Filed Jan. 17, 1955 2 Sheets-Sheet 1

INVENTOR:
E.W. JENKINS, JR.
BY [signature]
HIS ATTORNEY

Sept. 16, 1958

E. W. JENKINS, JR 2,852,600

WELL SURVEYING BY TELEVISION

Filed Jan. 17, 1955

2 Sheets-Sheet 2

INVENTOR:
E.W. JENKINS, JR.
BY

HIS ATTORNEY 2,852,600
Patented Sept. 16, 1958

2,852,600

WELL SURVEYING BY TELEVISION

Edgar W. Jenkins, Jr., Midland, Tex., assignor to Shell Development Company, New York, N. Y., a corporation of Delaware Application January 17, 1955, Serial No. 482,314

2 Claims. (Cl. 178—6.8)

This invention relates to the survey and inspection of oil and gas wells, and pertains more particularly to a system whereby the walls of a well or borehole, or the casing lining said walls, may be visually inspected from a remote point.

It is often of considerable importance in operations connected with the production of oil to obtain an accurate knowledge of the nature, conformation or condition of the walls of a borehole or of a casing installed therein. A clear picture of the borehole walls may give, for example, valuable information as to the character, strike or dip of the formations traversed by the well. A picture of the inside walls of a string of well casing may be extremely valuable in determining the location of a leak, in checking the adequacy of a perforating job, and so forth. Visual inspection of a well may furthermore be of considerable help in fishing operations.

Photographic methods developed for this purpose have in general not been satisfactory, mainly due to insufficient reliability and to time delays attendant their use. A camera must be raised to the surface and the exposed film developed before the adequacy of the photographs obtained can be determined. In case of failure, the whole job must be done over by again lowering the camera into the well and repeating the operation.

It is therefore an object of this invention to provide a method and a television system for examining the interior of deep wells from the surface.

It is also an object of this invention to provide a television system for examining deep wells, wherein the television camera proper and means for actuating camera control variables are lowered into the well in a pressure tight housing, while means for electrically controlling said actuating means remain at the surface.

It is also an object of this invention to provide a system wherein cable losses attendant the control of the television camera from the surface are minimized by the use of transmitter motor at the surface end and of receiver motors at the camera end of the cable, as described hereinbelow.

It is also an object of this invention to provide a system wherein said control is effected by means of a single transmitter motor at the surface and a plurality of receiver motors at the well bottom, said receiver motors being automatically and selectively connectable to said transmitter motor by a stepping relay mechanism.

These and other objects of the present invention will be understood from the following descriptions taken with reference to the attached drawings wherein.

In applying television for various industrial purposes, a definite tendency has been shown to separate the so-called front or optical end of the television camera from the associated control circuits, such as the sweep, focus, etc. circuits, in order to permit the use of a smaller camera and to make remote control possible. However, this separation between the optical and the control units limits the distance therebetween to a present maximum of about 1200 feet, this limit being imposed by inductance, capacitance and other losses in the connecting cable.

In order to avoid this distance limitation, it is proposed according to the present invention to dispense with the principle of separation outlined above, and to place the complete television camera and all associated actuating elements of the control circuits in a single housing. For greatest versatility, the maximum outside diameter of this housing should be limited to about 4½", while its length can be given any reasonable substantial value such as up to 15,000 feet.

The circuits for both camera and control units can be installed on either a long, narrow chassis, or assembled on a series of wafer chassis arranged transversely within the housing, in a manner well-known to those familiar with deep well instruments. Operation of the camera controls is accomplished by the use of electrical motors such preferably as selsyn receivers positioned back of the camera case, each motor or selsyn receiver being connected, by means such as a flexible shaft or gears, to a control of one of the camera variables. The motors or selsyn receivers are in turn controlled by corresponding motors or selsyn transmitters at a remote control point.

Inasmuch as the camera and camera control actuator circuits are not separated, only a television or radio frequency cable and the selsyn control wires are needed between the camera and the remote control point. Since selsyn systems in particular operate independently of variations in signal strength as long as these variations are equal on both sides of the line, only the television signal is critical in amplitude. Should the television cable losses rise to values higher than permissible, they can be offset by inserting suitable in-line amplifier means in the television cable.

Figure 1:
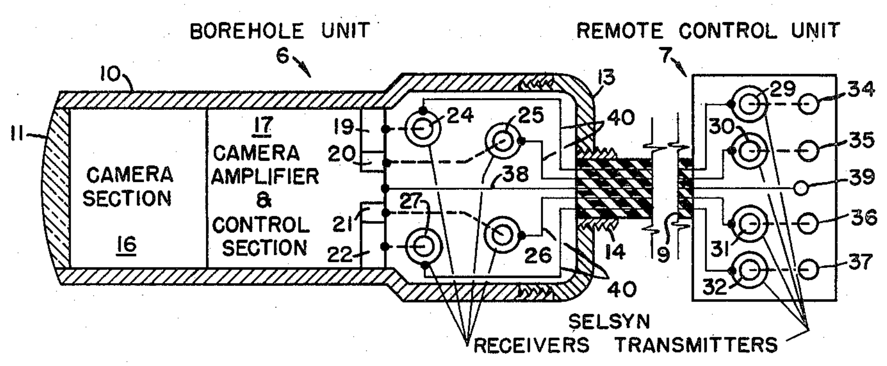
Figure 1 is a diagrammatic sketch of both the underground and the surface portions of the present system.

The above is diagrammatically illustrated in Figure 1 of the drawing, showing a borehole unit 6, adapted to be lowered into the well, and a remote control unit 7 located at the surface. The two units are connected by an insulated cable 9, preferably of the multi-conductor radio frequency type.

The borehole unit is encased in a fluid and pressure-tight housing 10, closed and sealed at one end to hold a television camera lens 11, made of high-strength glass, plastic or quartz capable of withstanding high bottom-hole pressures and temperatures. The housing itself may be advantageously made of casing having an outside diameter of about 4½ inches and a suitable length, such for example as up to 8 feet or more. The housing 10 is closed and sealed at the other end by a cover or head 13, provided with a jack or gland 14 for a mechanical and electrical connection with the cable 9.

Located within the housing 10 adjacent the lens 11 are a television camera section 16 and an amplification and control section 17 carrying the usual means for the control of the camera variables. Although any desired and necessary number of such controls may be used, only four of them are shown in the drawing for illustration purposes, the numeral 19 indicating a target control, 20 a focus control, 21 a synchronizing control and 22 a beam control unit. Also located within the housing 10 are means for suitably illuminating the borehole interval to be inspected, which means, being conventional, are not shown in the drawing.

Each of the above controls is actuated by one of the receiver selsyn motors 24, 25, 26 and 27, which are in turn electrically actuated to the desired position by the four corresponding transmitter selsyn motors 29, 30, 31 and 32 within the remote control unit 7 at the surface, where means for viewing the images from the camera can also be conveniently located. These viewing means are conventional and are not otherwise shown or described herein. The setting of the transmitter selsyns is determined by the setting of the manually or automatically adjustable controls or dials 34, 35, 36 and 37. All the mechanical linkages involved, such as gear, shaft, chain, etc. linkage are shown in dotted lines in Figure 1 both for the underground and the surface portion of the apparatus. The signals from the television camera, and the power to energize the camera and its control section are transmitted through a lead 38 connected at the surface to a socket or jack 39. The lead 38 may consist of a single conductor, or of a plurality of such conductors. Insofar as a plurality of conductors are required for selsyn operation, it is understood that each of the leads 40 shown in Figure 1 as connecting the transmitter selsyns 29, 30, 31 and 32 with the receiver selsyns 24, 25, 26 and 27 may also comprise a plurality of insulated conductors.

Figure 2:
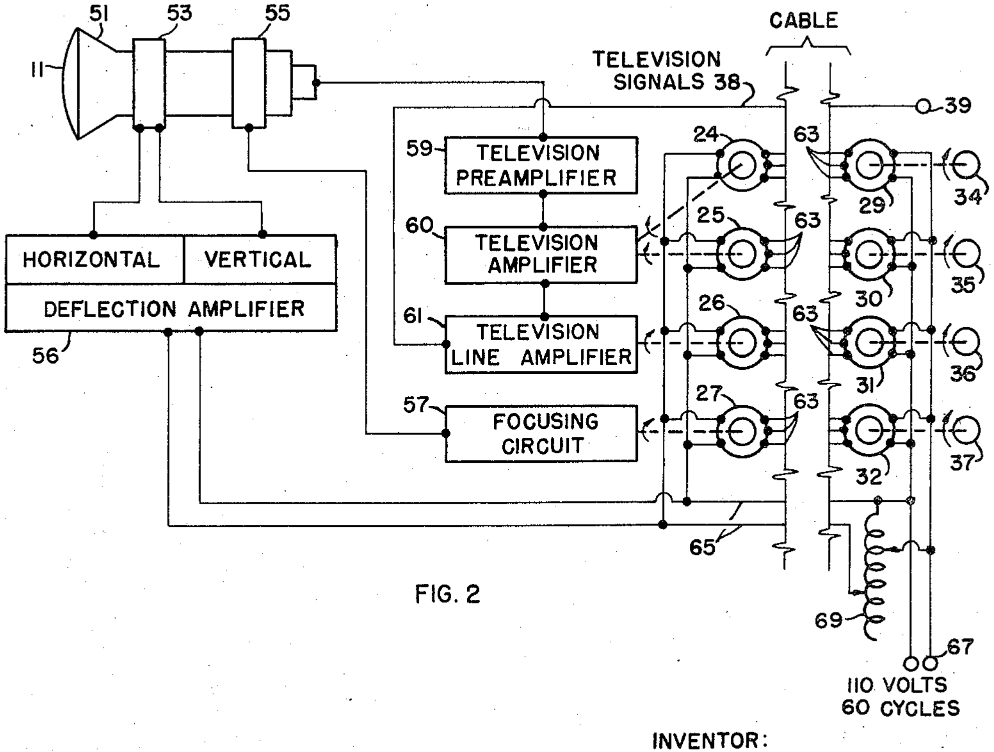
Figure 2 is a diagram showing the circuits of Figure 1 in somewhat greater detail.

A somewhat more detailed view of a system substantially identical with that of Figure 1 is given in Figure 2, wherein the same elements are designated by the same numerals. For simplicity the system of Figure 2 does not show the housing 10 nor include some of the synchronizing, blanking, power and other associated or auxiliary circuits whose organization is well-known to those familiar with the art.

The system of Figure 2 comprises a television camera 51 having a deflection yoke or coil 53 and a focusing coil 55.

The deflection coil is controlled by a deflection amplifier or amplifiers 56 producing the vertical and the horizontal deflections. The unit 56 may be energized by power supplied in well-known manner over the leads used to supply power to the selsyn receivers, as shown in Figure 2.

The focusing coil 55 is energized from a focusing circuit 57 controlled from the surface by means of a dial or knob 37 which actuates selsyn transmitter 32 and selsyn receiver 27 adapted to adjust the setting of the focusing circuit 57.

In the same way, the output signals of the television camera are passed through a preamplifier 59, amplifier 60 and line amplifier 61 and delivered to the surface through lead 38, the character and quality of said signal being subject to remote control from the surface by means comprising dials 34, 35 and 36, selsyn transmitters 29, 30 and 31 and selsyn receivers 24, 25 and 26.

Similarly, the output signals of the television camera, after passing through the amplifiers, may be used to modulate a radio frequency signal which is transmitted to the surface through lead 38, the radio frequency signal being demodulated at the surface and the television signal then supplied to a video monitor for visual presentation.

Leads interconnecting the selsyn transmitters with their receivers are shown at 63, while connections necessary to supply operating power are shown at 65. A power supply source, such as a commercial 110-volts 60 cycles line, is indicated at 67. An auto-transformer 69 is used to vary the A. C. supply voltage obtainable at the camera end and to compensate for cable losses. A similar transformer can be used also in the surface portion of the system to regulate the transmitter control unit voltage, as will be understood by those skilled in the art.

Figure 3:
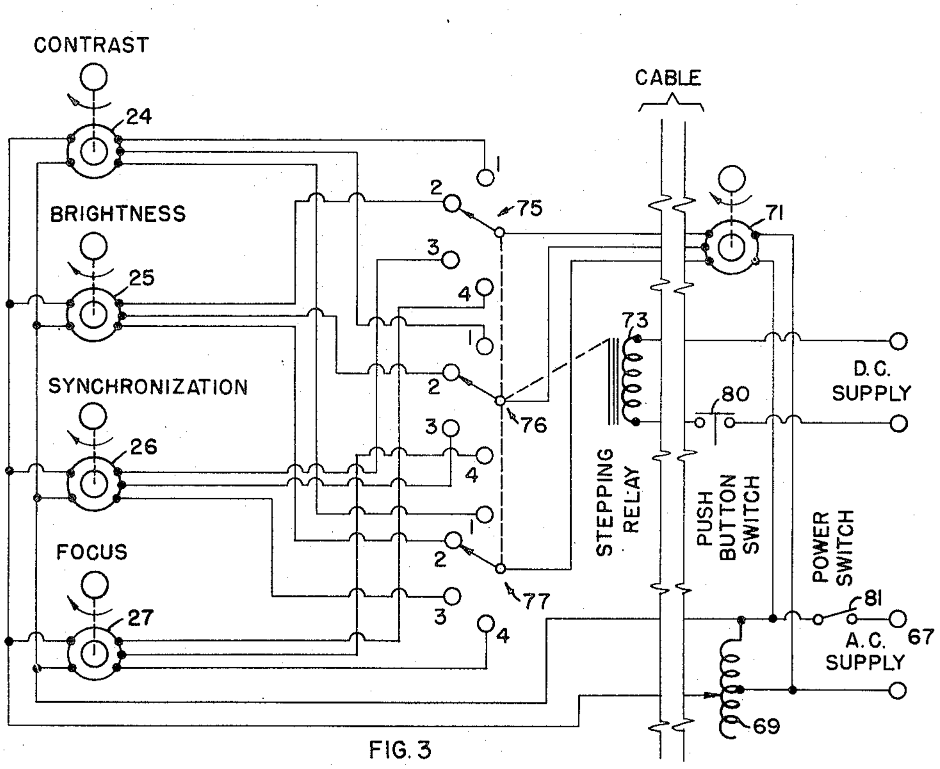
Figures 3 and 4 are circuit diagrams of variants of the circuit of Figure 2.

A modification of the circuit of Figure 2 is shown in Figure 3, where the same numerals are again used to indicate the same elements. Figure 3 omits all elements except those pertaining to the control of television camera variables by the use of the selsyn system of the present invention.

The system of Figure 3 is similar to those of Figures 1 and 2 in having a plurality of selsyn receivers 24, 25, 26 and 27 controlling a plurality of television camera variables, for example, contrast, brightness, synchronism and focus, respectively, by means of mechanical linkages indicated in dotted lines. Instead of having four separate selsyn transmitters, however, this system uses a single transmitter 71, which is selectively connectable to each of the receiver selsyns by means of a stepping relay comprising stepping switches 75, 76 and 77, driven by an actuating mechanism indicated at 73 through a mechanical linkage indicated in dotted lines. The D. C. supply for the stepping relay switch is controlled by means of a switch 80, such as a push button switch, and the A. C. supply for the operation of the selsyns is controlled by a power switch 81.

The operation of the system of Figure 3 may be briefly described as follows:

At the start of the operations, assuming that contacts of the stepping relay switch had been left in position 2 after the last run, all the switches are as shown in Figure 3.

The power switch 81 is then closed, applying A. C. power to the selsyn transmitter and receivers. Since the output of the transmitter selsyn 71 is applied to the receiver selsyn 25 through the contacts 2 of switches 75, 76 and 77, any movement of the transmitter selsyn rotor will cause a corresponding movement of the receiver 25 rotor and result, in the example chosen, in an adjustment of the brightness control variable.

If, thereafter, it is desired to adjust another variable, a momentary closing of the push button switch 80 will energize the stepping relay 73 and cause the stepping switches 75, 76 and 77 to step from contacts 2 to contacts 3, thereby disconnecting the transmitter 71 from the receiver 25 and connecting it to receiver 26 to effect the desired adjustment in the synchronization control variable. The control operations may then be carried on by closing the switch 80 any required number of times and thus connecting the transmitter 71 to any desired receiver.

Figure 4:
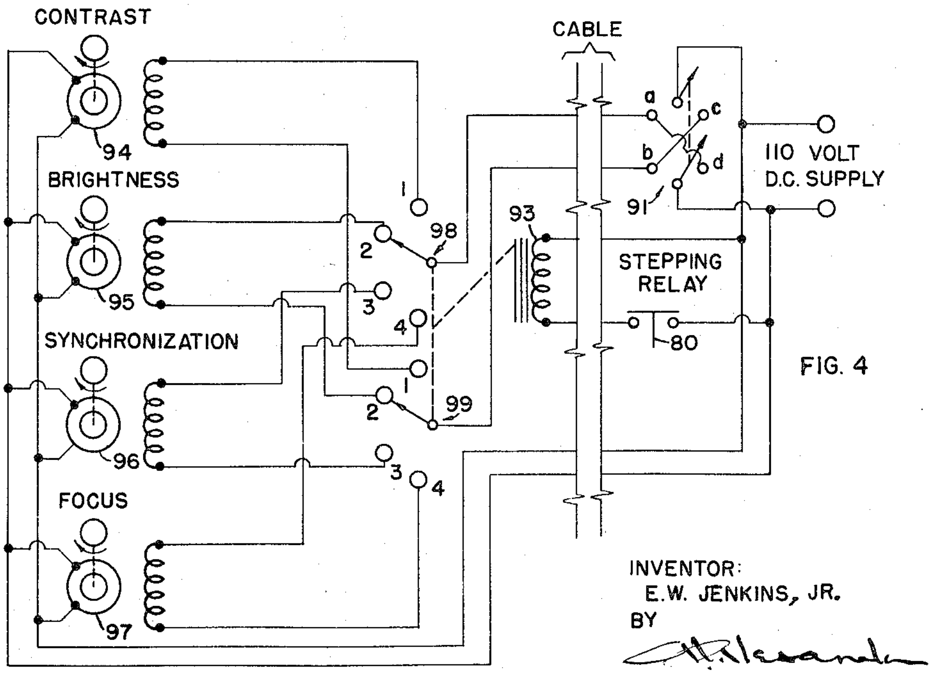

Although, for the purposes of this invention, it is preferable to use selsyn motors in view of the positive action and great accuracy obtainable therewith, it may in some cases be desired to use other types of electric motors. Figure 4 illustrates such use with regard to a system where the selsyn transmitter of Figure 3 is replaced by a double-throw, double-pole, center off switch 91, and the selsyn receivers by D. C. motors 94, 95, 96 and 97, energized by a stepping relay comprising an actuator 93 and stepping switches 98 and 99. The operation of the system of Figure 4 is similar to that described with regard to Figure 3, except that the operation of the push-button switch 80 causes a clock-wise rotation of the stepping switches 98 and 99 upon a closure of the switch 91 with the left-hand contacts *a—b*, and a counter-clockwise rotation of said stepping switches upon closure with the right-hand contacts *c—d*.

It is understood that in using the present method in petroleum wells, the techniques normally applied when using photography in wells are likewise applicable. Furthermore, it has been found that should circulating water fail to clear the hole sufficiently to permit a clear picture, a mixture of sodium silicate and water may be spotted over the interval needing inspection.

I claim as my invention:

1. A television system for inspecting deep wells, comprising a subsurface unit, a surface unit, and a conductor cable interconnecting said units, said subsurface unit comprising an elongated small diameter pressure-tight housing containing a television camera having a plurality of adjustable controls, a plurality of receiver motors each mechanically connected to actuate one of said controls, and a stepping relay capable of selectively connecting one of said receiver motors to the surface through said cable, and said surface unit comprising a source of power, a transmitter motor, first switch means for energizing the stepping relay from said source to connect said transmitter motor to a preselected receiver motor, and second switch means for energizing said transmitter and said receiver motors from said source, whereby a rotation of the transmitter motor to a predetermined position causes a corresponding rotation of the receiver motor, and means for viewing the images from the camera.

2. The system of claim 1, wherein the transmitter and the receiver motors are motors of the selsyn type.

References Cited in the file of this patent

UNITED STATES PATENTS

| | | |
|---|---|---|
| 1,514,353 | Thomas | Nov. 4, 1924 |
| 1,926,393 | Manson | Sept. 12, 1933 |
| 2,355,086 | Lang | Aug. 8, 1944 |
| 2,433,971 | Adams | Jan. 6, 1948 |
| 2,516,069 | Newhouse | July 18, 1950 |
| 2,632,801 | Donaldson | Mar. 24, 1953 |
| 2,677,996 | Laval | May 11, 1954 |

OTHER REFERENCES

Electronic Engineering, September 1948, page 294.